(12) United States Patent
De Cnodder

(10) Patent No.: US 6,868,063 B1
(45) Date of Patent: Mar. 15, 2005

(54) SHAPING METHOD AND RELATED SHAPER

(75) Inventor: Stefaan Jozef De Cnodder, Lille (BE)

(73) Assignee: Alcatel, Paris (FR)

( * ) Notice: Subject to any disclaimer, the term of this patent is extended or adjusted under 35 U.S.C. 154(b) by 839 days.

(21) Appl. No.: 09/691,049

(22) Filed: Oct. 19, 2000

(51) Int. Cl.[7] .................................. G01R 31/08
(52) U.S. Cl. .................................... 370/236
(58) Field of Search ............... 370/230.1, 232–236, 370/235.1

(56) References Cited

U.S. PATENT DOCUMENTS

| | | |
|---|---|---|
| 5,132,966 A | 7/1992 | Hayano et al. |
| 5,793,747 A | 8/1998 | Kline |
| 5,812,525 A | 9/1998 | Teraslinna |
| 5,949,795 A | 9/1999 | Moroney et al. |
| 6,081,843 A | 6/2000 | Kilkki et al. |
| 6,198,724 B1 | 3/2001 | Lam et al. |
| 6,247,072 B1 | 6/2001 | Firestone |
| 6,327,246 B1 | 12/2001 | Jones |
| 6,333,917 B1 | 12/2001 | Lyon et al. |
| 6,377,583 B1 * | 4/2002 | Lyles et al. ............... 370/412 |
| 6,404,767 B1 | 6/2002 | Depelteau et al. |
| 6,438,134 B1 | 8/2002 | Chow et al. |

* cited by examiner

*Primary Examiner*—Kenneth Vanderpuye
(74) *Attorney, Agent, or Firm*—Sughrue Mion, PLLC

(57) ABSTRACT

The shaping method buffers data packets of the incoming data flow and determines a leaking time moment for a buffered data packet. The leaking time moment is when the buffer should leaks a data packet. Determining the leaking time moment is a function of traffic contract parameters related to the incoming data flow. Status information is received from a marker that is downstream from the shaper, and a conform time moment is determined according to the status information and to a predefined drop priority. When the buffer leaks a data packet at the conform time moment, upon reception, the buffered data packet receives the predefined drop priority from the marker. The conform time moment is compared with the leaking time moment, and when the conform time moment is earlier, the leaking time moment is constituted with the conform time moment to leak the buffered data packet at that time moment.

9 Claims, 1 Drawing Sheet

SHAPING METHOD AND RELATED SHAPER

RELATED APPLICATIONS

The present application is related to U.S. application Ser. No. 09/392,336 filed Sep. 8, 1999, which is incorporated by reference herein. U.S. application Ser. No. 09/392,336 issued as U.S. Pat. No. 6,680,907 to Bonaventure on Jan. 20, 2004.

BACKGROUND OF THE INVENTION

Similar to this above mentioned application, the present application relates to a shaping method to convert an incoming data flow with an incoming data packet rate into an outgoing data flow with an outgoing data packet rate. Furthermore, the invention relates to a shaper and a marker that realizes such a shaping method, and to a communication network including any one of such a shaper and such a marker.

New applications and user requirements are driving the need for the evolution from the single Best-effort service provided by the Internet today towards a network where different levels of service are supported. Two models are defined to provide different levels of service, namely the Integrated Services (Intserv) model and the Differentiated Services (Diffserv) model.

The Intserv model has been proposed to provide a set of service commitments, ranging from throughput guarantees to bounds on the end to end delay and packet loss at the flow level, whereas the concept of Diffserv designs a Type of Service (ToS) field of the IP header to allow different types of IP datagrams to be distinguished from each other so that they could be forwarded differently. The Diffserv model reuses the ToS field, named Diffserv Code-Point (DSCP) to indicate the "Quality of Service" of the packet.

Although that the present application is applicable in different kinds of telecommunication networks, as will be explained later herein, the principle working of the present invention will be explained in the context of such a Diffserv network.

The Diffserv model reuses the ToS field, renamed as Diffserv Codepoint DSCP in order to indicate the 'QoS requirement' of the packet. Since each packet contains its own 'QoS requirement' that determines the way it should be treated at each hop, state information for individual flows is no longer necessary. The scalability issue has, in addition, introduced the need for traffic aggregation that aims at providing QoS without having to distinguish individual flows.

In such a Diffserv network, the incoming data is subject to marking that assigns a low drop probability to a portion of the packets not exceeding a subscribed profile, i.e., a traffic contract, and a higher drop probability for the remaining packets, called the excess traffic. Such markers are for instance token bucket based such as a single rate three color marker and a two rates three color marker. The marking process, which is negotiated as part of the Service Level Agreement SLA, is generally implemented at the interface between the customer and the Internet Service provider ISP or between two different ISP'S.

It has to be remarked that according to the used terminology the traffic is metered before being marked. Usually, both functionalities are combined in a single device whereby the term traffic marking is often used to refer to both functions, i.e., metering and marking.

It has to be explained that according to the DSCP field, a priority also called a color is assigned to a packet e.g. a green packet, a yellow packet or a red packet. In the core network, a green packet has the lowest drop probability, a yellow packet has a higher drop probability and finally, a red packet has the highest drop probability. A marker can work in a colorblind mode or in a color aware mode. When a marker works in a colorblind mode, it will not look to the color of the incoming packet and each packet is subject to an identical installed algorithm in order to be marked by the marker with one of the applicable colors. Such an algorithm takes, e.g., the traffic rate into account in order to determine the color for a packet. When a marker works in a color aware mode, the marker takes the color of the incoming packet into account in order to define an eventual other color for the packet.

A performance degradation is observed for Internet working traffic, i.e., traffic generated by applications running on top of Transmission Control Protocol TCP or User Data Protocol UDP, due to the burstiness of the traffic resulting of, e.g., the application's packet generation process which is bursty by nature. Indeed, for example WEB browsing exhibits ON/OFF traffic that corresponds to the download of a web page and the time needed to read the page, respectively.

Due to the burstiness, several packets can be marked out-of-profile with high drop precedence even if the long-term average throughput that is estimated for a large time-scale of the traffic aggregate is in most of the times, less than the subscribed profile.

In order to improve the performance of a marker, shapers are used. A rate adaptive shaper improves the performance of, e.g., TCP traffic when a marker is used at the ingress of a diffserv network by reducing the burstiness of the traffic and thus by increasing the proportion of packets marked as low drop probability, i.e., high priority, e.g., green, by the marker. Indeed, by reducing the burstiness of the traffic, the shapers increase the percentage of packets marked as green by the marker and thus the overall throughput of the users using such a shaper.

In this way, a rate adaptive shaper aims at increasing the ratio of packets that are assigned the highest level of forwarding treatment by buffering and appropriate scheduling of packets before applying traffic control functions.

A shaping method for use by such a shaper in a communication network converts an incoming data flow with an incoming data packet rate into an outgoing data flow with an outgoing data packet rate and comprises the following steps:

buffering, by a buffer of the shaper, data packets of the incoming data flow and generating thereby buffered data packets; and determining, by a first determiner of the shaper, a leaking time moment for one of the buffered data packets, the leaking time moment is a time moment at which the buffered data packet must be leaked by the shaper and that determines thereby the outgoing data packet rate.

A classical shaper, known in the prior art, delays packets of a packet stream until they are conforming to a predefined traffic contract algorithm. This means that for a classical shaper the outgoing data packet rate is determined according to the parameters of the installed traffic contract. The meter/marker calculates a release time for a received data packet of a data stream according to the installed traffic contract algorithm in order to remain the data packet in profile and provides this release time to the classical shaper. The shaper will release the data packet according to this received release time. However, a disadvantage of such a classical shaper is that it does not allow excess traffic. This means that there is no minimum level installed upon the release time that is needed to support TCP traffic efficiently. At a certain moment in time, the buffer of a classical shaper will become full and the classical shaper will discard packets.

The above mentioned application first describes a shaper used for video services that smoothes the traffic as a function of the past information of the incoming data packet rate as well as the actual buffer occupancy of the buffer.

This smoothing method which is suited for, e.g., variable bit rate video services is, however, improved by the mentioned application in order to support also service categories with a predetermined minimum guaranteed bandwidth which allow the use of excess bandwidth. The improvement is realized by determining the adaptive outgoing data packet rate as a function of the future incoming data packet rate and the actual buffer occupancy and, furthermore, as a function of traffic parameters related to the incoming data traffic such as the predefined peak data packet rate and the predefined minimum data packet rate. This is described in the above-referred application. In this way a shaper is described that determines an adaptive output rate, i.e., consecutive release times for the consecutive data packets, based upon traffic contract parameters related to the incoming data flow, such as a minimum cell rate and a peak cell rate.

Such a rate adaptive shaper, however, does not take the result of a traffic contract algorithm into account. This means that the shaper calculates a release time and might delay a data packet although it would already have been allowed to release the packet according to the traffic contract.

SUMMARY OF THE INVENTION

An object of the present invention is to provide a shaping method and shaper of the above known type but which supports also service categories with a predetermined minimum guaranteed bandwidth whereby the use of excess bandwidth is allowed, and whereby the applied delay is upper bounded, and which furthermore transmits packets, that would be conforming at an earlier instant than the computed leaking time, as soon as it becomes conforming, and whereby the delay in the shaper is decreased as much as possible.

The object is achieved by the shaping method, a shaper implementing the method, a marker and a communication network incorporating a shaper and/or a marker, all as described below.

Indeed, this object is achieved due to the fact that the leaking time moment is realized as a function of traffic contract parameters such as the peak cell rate and the minimum cell rate which are related to the incoming data flow; and due to the fact that the method according to the present invention further comprises the steps of:

a second determiner receiving status information of a marker that is downstream coupled to the shaper; and determining by the second determiner a conform time moment according to the status information and according to a predefined drop priority, the conform time moment is a time moment at which, in the event that the data packet would be leaked by the buffer at that conform time moment, the buffered data packet would receive from the marker, upon reception, the predefined drop priority;

comparing the conform time moment with the leaking time moment; and in the event that the conform time moment is earlier than the leaking time moment, the comparing means giving the leaking time moment the value of the conform time moment in order to leak the buffered data packet (P) at that time moment.

The rate adaptive shaper makes the traffic stream smooth such that as many as possible packets will receive a good drop priority. The rate adaptive shaper according to the present invention tries in addition to decrease the delay in the shaper.

It has to be remarked that the marker retrieves status information and that according to this status information and for at least one predefined drop priority a conform time moment is calculated. This conform time moment might be calculated by the marker itself whereby the status information is in fact the calculated time moments for the at least one predefined drop priority, but the conform time moment might as well be calculated by the shaper whereby the status information is information such as, e.g., a filling level of a bucket of a token bucket marker and its related bucket parameters.

It has to be remarked that, rate adaptive shapers can be used in either pure best-effort enabled networks or any Quality of Service enabled networks such as differentiated service networks (Diffserv networks) or any kind of packet network, be it ATM, Frame Relay or IP.

A further feature of the present invention is that the conform time moment can be determined according to a predefined drop priority assigned to the buffered data packet. This means that the predefined drop priority is the drop priority of the buffered packet to be leaked. Indeed, in this way when the conform time moment is earlier than the leaking time moment, the buffered data packet will retain its actual drop priority when it passes through the marker, since its leaking time moment was constituted with this conforming time moment which in turn was determined just with the purpose to keep the packet in profile of the predefined drop priority.

In the event that the conform time moment is later than the leaking time moment, a possible implementation is that the leaking time moment might be retained and doesn't have to be constituted by the conform time moment since this would again introduce unnecessary delay.

Another implementation in such an event is that, in the event that the conform time moment is later than the leaking time moment, the buffered data packet might be leaked immediately. Since the packet would be leaked at the leaking time moment due to the conform time moment being later, the packet will receive a worse drop priority at the marker anyway, the packet might as well be leaked immediately in order to prevent large delays.

Finally, a third possible implementation for the event when the determined conform time moment is later than the determined leaking time moment is that the method further comprises a step of giving the leaking time moment a second conform time moment in order to leak the buffered data packet accordingly. This second conform time moment is determined by the second determiner according to the status information of the marker and according to another second drop priority wherefore this conform time moment is earlier than the leaking time moment. In this way the packet is transmitted by the shaper at the time schedule when it becomes conforming to the best color, i.e., best drop priority before the time schedule computed by the rate adaptive shaper, i.e., leaking time moment. The packet will receive from the marker a worse drop priority but, however, in a controlled way, i.e., controlled by the shaper.

BRIEF DESCRIPTION OF THE DRAWINGS

The above and other objects and features of the invention will become more apparent and the invention itself will be best understood by referring to the following description of an embodiment taken in conjunction with the accompanying FIG. 1 that represents a shaper being coupled in upstream direction to a marker. The working of both devices according to the present invention in accordance with its telecommunication environment will be explained by means of a functional description of the different blocks as shown therein. Based on this description, the practical implementation of the blocks will be obvious to a person skilled in the art and will therefor not be described in further details. In addition, the principle working of the shaping method will be described in further detail.

DETAILED DESCRIPTION OF THE INVENTION

Figure 1:
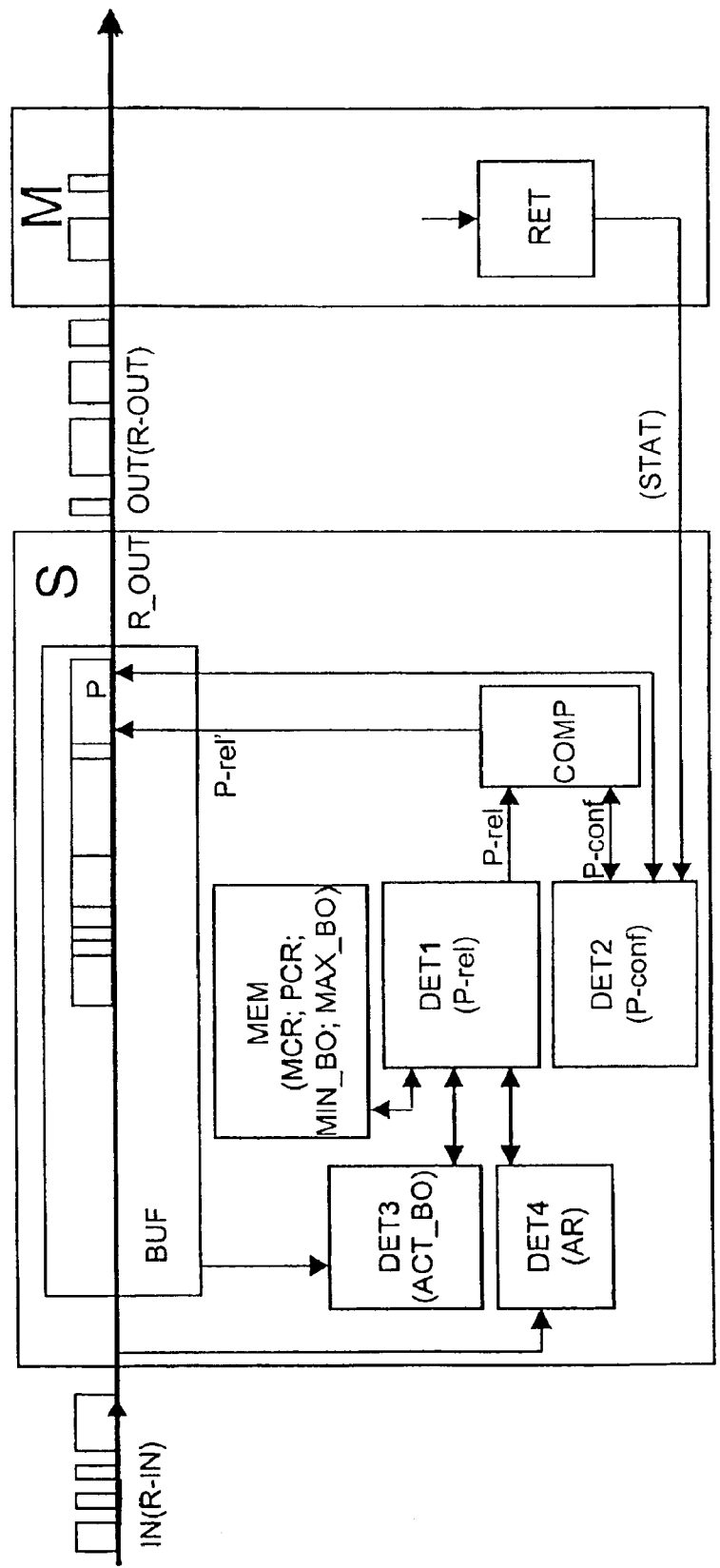

For the purpose of the description of an embodiment, a Diffserv telecommunication network is preferred. The part of the Diffserv telecommunication network that is shown in FIG. 1 comprises a shaper S, which is upstream coupled to a marker M.

The shaper S comprises a buffer BUF, a leaking time determiner DET1, a conform time determiner DET2, a buffer occupancy determiner DET3, an average incoming data rate determiner DET4, memory MEM and a comparator. The buffer BUF is coupled between an input of the shaper S and an output of the shaper S, and furthermore to the buffer occupancy determiner DET3 and to the comparator COMP. The leaking time determiner DET1 is coupled to the memory MEM, to the buffer occupancy determiner DET3, to the average incoming data packet rate determiner DET4 and to the comparator COMP. The conforming time determiner DET2 is coupled to the comparator COMP, to the buffer BUF and to an input of the shaper S. The marker M comprises a retriever RET which is upstream coupled via an output of the marker M to the comparator COMP of the shaper S.

The shaper S converts an incoming data flow IN with an incoming data packet rate R-IN into an outgoing data packet flow with an adaptive outgoing data packet rate R-OUT. The buffer BUF is a first in first out buffer FIFO and is comprised to buffer data packets of the incoming data flow IN and to generate thereby buffered data packets. A first one of these buffered data packets is shown in FIG. 1 as P. The leaking time determiner DET1 is comprised in the shaper S in order to determine a leaking time moment P-rel for one of the buffered data packet e.g. for P. This leaking time moment is a time moment at which the data packet must be leaked towards the marker M. The function of determining a leaking time moment is executed on a regular base for each consecutive buffered data packet, starting with the first packet in the buffer BUF, i.e., P, whereby also the adaptive outgoing data packet rate is hereby determined.

It has to be remarked here that also the different packet lengths of the data packets has to be brought into account in order to determine the different leaking time moments and the conform time moments for the different packets. Each principle intervention of this packet length is mentioned in this description of an embodiment, however the detailed formulae are not given in detail since this goes beyond the aim of the present invention.

Furthermore, the present description might be adapted by a person skilled in the art in order to bring the different packet lengths into account for determining the leaking time moment and the conform time moment for each buffered data packet and in order to determine thereby the outgoing data packet rate of the shaper S.

The leaking rate is determined as a function of a value of an estimated future incoming data packet, a value of an actual buffer occupancy, a predetermined peak data packet rate and a predetermined minimum data packet rate of the incoming data flow. This is described in details in the above-mentioned application. The estimated future incoming data packet rate is determined by the average incoming data packet rate determiner DET4. The value of an actual buffer occupancy is determined by the buffer occupancy determiner DET3. The memory comprises a value for the predetermined peak data packet rate, a value for the predetermined minimum data packet rate, a value of a minimum buffer occupancy threshold and a value of a maximum buffer occupancy threshold. How the leaking time determiner DET1 determines the leaking time for a buffered data packet is not repeated here in details. The aim of the description of the present application is the fact that a leaking time is determined as a function of the above-mentioned parameters which provides the advantage of reducing the burstiness of the incoming data packet rate of incoming data flow while it supports a quality of service category which provides a service with a predetermined minimum guaranteed bandwidth according to the predetermined minimum data packet rate of an incoming data flow and which allows the use of excess bandwidth being limited according to the predefined peak data packet rate, over this predetermined minimum guaranteed bandwidth. The leaking time moment is forwarded to the comparator COMP.

The marker M is for this preferred embodiment implemented by a Three Color Marker which is a token bucket based marker that marks the packets according to a pre-negotiated traffic contract of the source of the incoming data flow IN. Packets are assigned different values for its associated Code-Points whereby the level of its forwarding treatment in the Diffserv network is determined. A two Rate Three color Marker trTCM uses two buckets, a first bucket and a second bucket, with respectively a Committed burst Size and a Peak burst Size. Tokens are generated to fill each bucket with, respectively, a Committed Information Rate and a Peak Information Rate. A token is representative for one byte, whereby the content of a token bucket is compared to the length of a data packet. Two modes of operation are possible: a color aware mode and a colorblind mode. For this embodiment the colorblind mode is chosen, whereby the color of a packet, i.e., its assigned drop priority is not taken into account in order to determine its new color assigned by the marking process.

The principle working of the marker goes as follows:
each arriving packet is colored:
green; if the packet size is less than the first and the second token occupancies in the buckets; the tokens in both buckets are decreased according to the packet size of the data packet; and
yellow; if the packet size is more than the tokens in the first bucket but less then the number of tokens in the second bucket; the first bucket remains unchanged while the second bucket is decreased according to the packet size of the packet; and
red; if the packet size is more than the number of tokens in the second bucket; both buckets are left unchanged in this case.

The further detailed working of the algorithm used by the trTCM is not described here since this goes beyond the main idea of the present invention. The aim is the fact that status information STAT that comprises information regarding the actual coloring process of the marker M, has to be forwarded to the shaper S. According to this preferred implementation of the marker M, the status information STAT comprises the number of available tokens that are present, respectively, in the first and in the second bucket. The retriever RET retrieves the status information from the marker M and provides this status information STAT to the shaper S.

It has to be remarked that the retriever might forward the status information to the shaper S according to different procedures, e.g., upon a regular base, upon request and triggering from the shaper itself S, etc.

For this preferred embodiment the retriever RET provides on a regular base the status information to the shaper S.

The shaper S of the present application has to know the status of the marker M in order to be enabled to release a packet when it becomes conforming to a predefined drop priority before it should have been released, if this is the case, according to the leaking time moment which is determined by the leaking time determiner DET1. Since the objective of the shaper S is to maximize the number of in-profile packets while minimizing the incurred delay, the improvement of the present application is to never delay a packet if it still can be colored green by the marker M. A packet is thus leaked from the shaper S, if there are enough tokens available to color the packet green.

Therefore, the conform determiner DET2 determines a conform time moment for the first packet P in the buffer B according to the received status information STAT and according to the packet length of this packet. This conform time moment is provided to the comparator COMP.

The comparator compares the leaking time moment P-rel with the conform time moment P-conf of the packet P. In the event that the conform time moment P-conf is earlier than the leaking time moment P-rel, the comparator constitutes the leaking time moment P-rel with this conform time moment t-conf and provides thereby an adapted leaking time moment P-rel'. The comparator COMP provides this adapted leaking time moment P-rel' to the buffer BUF in order to leak the packet P at that time moment.

The present shaper S is enabled to support three different modes for the event when the conform time moment P-conf is later than then leaking time moment P-rel: the shaped mode; the fast mode and the promoted mode.

In the fast mode, the shaper S transmits the packet at the leaking time mode which is anyway earlier than the conform time moment. The comparator COMP does not replace the conform time moment P-conf by the leaking time moment P-rel. The leaking time moment P-rel retains its value calculated by the leaking time determiner DET1.

In the fast mode, the shaper leaks the packet P immediately. This means that the comparator replaces the calculated leaking time moment P-rel with a substantially 'now' time moment. Since it is not possible to retain the packet in profile, large delays are prevented with this fast mode.

In the promoted mode, the packet is transmitted at a time moment when it becomes conforming to the best color possible. It has to be remembered here that the marker M of the present embodiment is working in a color-blind mode. This means that the actual color of an incoming packet does not count, but however, the best possible color, i.e., green is always attempted. In this way, also the shaper S will always try to leak the packet according to the best possible color, i.e., green. But, in the event when the leaking time moment is earlier than the conform time moment, i.e., conform time moment according to a predefined drop priority, i.e., according to the present embodiment: green; leaking in order to be still conform to this best possible color, is not possible anymore. However, in the promoted mode, the shaper S tries to leak the packet according the next best color, i.e., yellow or, when this is not possible anymore, according to a following color. So, in the event that the conform time moment P-conf is later than the leaking time moment P-rel, the comparator. COMP generates a next best signal (only shown by means of a double arrow between the comparator COMP and the conform time determiner DET2) and provides this signal to the conform time determiner DET2. The conform time determiner DET2 calculates a second conform time moment P-conf according to the status information STAT, the packet length of P and according to a second drop priority, i.e., yellow. The conform time determiner DET2 provides this second conform time moment P-conf to the comparator COMP. The comparator COMP controls again that the, now, second conform time moment P-conf' is earlier than the leaking time moment P-rel. If this is the event, than the comparator constitutes the leaking time moment P-rel with the second conform time moment P-conf and generates an adapted leaking time moment P-rel'. The adapted leaking time moment is provided to the buffer BUF in order to leak the packet P accordingly.

The following paragraph describes the principle working of the present application for the event of a decrease. A packet P of an incoming data flow IN enters the shaper S and is buffered in the buffer BUF. By the time the packet P advances in the buffer BUF, the leaking time determiner DET1 determines according to the above-described algorithm, a leaking time moment P-rel for the packet P. The leaking time determiner provides this leaking time moment P-rel to the comparator COMP. On the other hand, the retriever RET of the marker provides status information STAT on a regular base to the conform time determiner DET2. The conform time determiner DET2 uses this information in order to calculate for the packet P, a conform time moment P-conf, i.e., a time moment at which, in the event that packet P would be leaked by the shaper S at this conform time moment P-conf, the packet P would receive from the marker M a predefined drop priority, i.e., green. The conform time moment P-conf is forwarded by the conform time determiner DET2 to the comparator COMP. The comparator COP compares both received time moments concerning the packet P. Presume a situation that, on the time schedule, the conform time moment P-conf is earlier than the leaking time moment P-rel. According to this situation, the comparator COMP constitutes the value of the leaking time moment P-rel with the value of the conform time moment P-conf and provides thereby an adjusted leaking time moment P-rel'. This adjusted leaking time moment P-rel' is forwarded to the buffer BUF which leaks the buffered data packet P at that time moment, i.e., the time moment when it just became conforming for the predefined drop priority, i.e., green. When the packet P arrives at the marker M, the first bucket and the second bucket will be filled with enough tokens, regarding the arrival time moment and the packet length of the packet P, in order to color the packet P with the predefined drop priority, i.e., green.

So, according to the calculations of the leaking time determiner DET1, the shaper S makes the incoming traffic IN smooth such that as many as possible packets are colored as green, and furthermore, according to the installed feedback system of status information STAT from the marker M to the shaper S, the shaper S decreases the delay in the buffer BUF as much as possible.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

It is to be noted that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

Similarly, it is to be noted that the term 'coupled', also used in the claims, should not be interpreted as being limitative to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

What is claimed is:

1. A shaping method for use by a shaper in a communication network to convert an incoming data flow with an incoming data packet rate into an outgoing data flow with an adaptive outgoing data packet rate, said shaping method comprising:

buffering, with a buffer of said shaper, data packets of said incoming data flow and generating thereby buffered data packets;

determining by a first determiner of said shaper a leaking time moment for a buffered data packet of said buffered data packets, said leaking time moment being a time moment at which said buffered data packet must be leaked by said buffer and that determines thereby said adaptive outgoing data packet rate, said step of determining said leaking time moment being realized as a function of traffic contract parameters related to said incoming data flow;

receiving status information of a marker which is downstream coupled to said shaper;

determining a conform time moment according to said status information and according to a predefined drop priority, said conform time moment being a time moment at which, in the event of leaking said data packet by said buffer at said conform time moment, said buffered data packet receives from said marker, upon reception, said predefined drop priority; and comparing said conform time moment with said leaking time moment; and in the event when said conform time moment is earlier than said leaking time moment, giving said leaking time moment the value of said conform time moment in order to leak said buffered data packet at that time moment.

2. The shaping method according to claim 1, wherein said conform time moment according to a drop priority assigned to said buffered data packet.

3. The shaping method according to claim 1, wherein in the event that said conform time moment is later than said leaking time moment, retaining by said comparing means the value of said leaking time moment, in order to leak said buffered data packet at that time moment.

4. The shaping method according to claim 1, wherein in the event that said conform time moment is later than said leaking time moment, leaking said buffered data packet substantially immediately.

5. The shaping method according to claim 1, wherein that in the event that said-conform time moment is later than said leaking time moment, said comparing means gives said leaking time moment the value of a second conform time moment in order to leak said buffered data packet at that second time moment, said second conform time moment being determined according to said status information and according to a second drop priority and being earlier than said leaking time moment.

6. A shaper for use in a communication network to convert an incoming data flow with an incoming data packet rate into an outgoing data flow with an adaptive outgoing data packet rate, said shaper comprising:

a buffer to buffer data packets of said incoming data flow and to generate thereby buffered data packets;

a first determiner to determine a leaking time moment for one of said buffered data packets at which said buffered data packet must be leaked by said buffer and to determine therewith said adaptive outgoing data packet rate, said first determiner being enabled to determine said leaking time moment as a function of traffic contract parameters being related to said incoming data flow;

a second determiner receiving status information of a marker which is downstream coupled to said shaper and determining a conform time moment according to said status information for said buffered data packet, said conform time moment being a time moment at which, in the event of leaking said buffered data packet by said buffer at said conform time moment, said buffered data packet receives upon reception from said marker a predefined drop priority; and a comparer coupled between said first determiner, said second determiner and said buffer and comparing said conform time moment with said leaking time moment and, in the event that said conform time moment is earlier than said leaking time moment, giving said leaking time moment the value of said conform time moment in order to leak said buffered data packet at that time moment.

7. A marker for use in a communication network upstream coupled to a shaper, wherein said shaper is a shaper according to claim 6 and that said marker comprises a retriever retrieving from said marker status information and transmitting said status information to said shaper.

8. A telecommunication network, comprising at least a shaper according to claim 6.

9. A telecommunication network, comprising at least a marker according to claim 7.

* * * * *